Sept. 30, 1958 E. O. LAWRENCE 2,854,504

SYSTEM OF COLOR TELEVISION TRANSMISSION

Filed Jan. 8, 1953 5 Sheets-Sheet 1

INVENTOR.
Ernest O. Lawrence
BY Lippincott & Smith
ATTORNEYS

INVENTOR.
Ernest O. Lawrence
BY Lippincott & Smith
ATTORNEYS

SYSTEM OF COLOR TELEVISION TRANSMISSION

Filed Jan. 8, 1953 5 Sheets-Sheet 3

INVENTOR.
Ernest O. Lawrence
BY
Lippincott + Smith
ATTORNEYS

SYSTEM OF COLOR TELEVISION TRANSMISSION

Filed Jan. 8, 1953 5 Sheets-Sheet 4

INVENTOR.
Ernest O. Lawrence
BY Lippincott & Smith
ATTORNEYS

Sept. 30, 1958 E. O. LAWRENCE 2,854,504

SYSTEM OF COLOR TELEVISION TRANSMISSION

Filed Jan. 8, 1953 5 Sheets-Sheet 5

INVENTOR.
Ernest O. Lawrence
BY Lippincott & Smith
ATTORNEYS

United States Patent Office 2,854,504

Patented Sept. 30, 1958

2,854,504

SYSTEM OF COLOR TELEVISION TRANSMISSION

Ernest Orlando Lawrence, Berkeley, Calif., assignor to Chromatic Television Laboratories, Inc., New York, N. Y., a corporation of California Application January 8, 1953, Serial No. 330,280

13 Claims. (Cl. 178—5.4)

This invention relates to systems of color television, and particularly to means and methods for encoding, transmitting, and decoding signals representative of both the brilliancy and the composition, in terms of three primary or component colors, of the elementary areas in a field of view which is to be reproduced as a polychrome television image.

Among the objects of this invention are to provide a color television system wherein the signals transmitted are representative of the full geometrical detail of the field of view in such form as to be received on ordinary monochrome or black and white television receivers without degradation in comparison with ordinary monochrome signals, but which carry, in addition, full information, in so far as it can be recognized by the eye, of the color composition of all the signals transmitted with respect to the three primary or component colors, so that the received signals can be translated to produce a polychrome television image with the maximum color fidelity of which a three color system is capable; to provide a color television system of the character described wherein the reproduced images are free from flicker when reproduced either as monochrome or as polychrome images; to provide a television system wherein the signals representative of color are distinguished by their amplitude alone, relative phase having no effect upon the hue or saturation of the reproduced colors, so that phase distortions in transmission, or the method of modulation upon the carrier (whether single or double side band) has no effect, either as transients or otherwise, upon a hue reproduced in response to such signals; as a consequence of the above to provide a system of color television which is fully compatible with present black and white television transmission standards and whereby monochrome television transmitters may be modified so as to permit the transmission of color signals by mere additions to the studio equipment without major modification of the synchronizing apparatus, other ancillary equipment or the radio transmitter itself; to provide a color television system of the character described which employs straightforward engineering techniques and wherein the problems of maintenance and adjustment are within the capabilities of the usual operating staff; and to provide a system which permits the employment of reasonably simple receiving apparatus such as may be handled by untrained television viewers and represents only a moderate increase in complexity and cost when compared to monochrome apparatus.

The present invention depends for its effectiveness upon a number of characteristics of the eye which have now been well established. The first of these characteristics is that the eye can resolve differences in brilliancy or luminance much more readily than it can resolve differences in chromaticity or hue; fine detail in a field of view is recognized by differences in brilliancy rather than by differences in color, so that in scanning a television field abrupt differences in luminance must be accurately represented but changes in chromaticity need not follow nearly as rapidly. Much experiment has shown that whereas the changes in luminance required to give a certain amount of geometrical detail in a picture may require a frequency band of four megacycles, in accordance with present standards, no degradation in the apparent fidelity of reproduction is met with if the band allotted to the color is reduced to one-half, one-quarter, or even less of this total band. Where there is a transition from a portion of the field having one color content and degree of luminosity the transition in luminosity must be sharply marked, but if the color shades relatively gradually from one value to another the eye does not readily recognize this fact.

Closely related to this last mentioned characteristic is the sensitivity of the eye to flicker, which might be referred to as resolution in time, just as appreciation of detail is resolution in space. Recognition of flicker as is well known, depends upon a number of factors; the area in which change in luminance causing the sensation of flicker is occurring, the intensity of the luminance, the degree of variation in terms of percentages and the sensitivity of the particular observer. The eye varies widely in sensitivity with respect to the various colors to which it can respond, being most sensitive to illumination of a yellowish-green color, less sensitive at the red end of the spectrum and very much less sensitive at the blue end of the spectrum. Ability to perceive detail in a field illuminated by light of any color is proportional to this sensitivity, provided the energy in the radiation which is perceived as light is of equal intensity. Luminance being a measure of effect of the light upon the eye, it has been standard practice to compare the luminance of various light sources by means of the "flicker photometer," wherein two lights of different color content are compared by illuminating a field with first one and then the other at a relatively slow rate such as will produce a bad sense of flickering if the lights are of different luminance. When the lights are adjusted to equal luminance the flicker disappears. What is seen is a color resulting from the addition of the two being compared, and not a color which flickers in hue, until the rate becomes very slow indeed. It is possible, therefore, to add component colors in sequence to produce a third color, provided the luminance of the additive colors are the same, at a very much lower rate than would be possible if the luminance of the colors were different. Because of the very great difference in luminance of the color components which produce, additively, the best fidelity of reproduction, it has, in the past, been extremely difficult to produce satisfactory color television images through the use of sequential systems, and a recent tendency has been to go to simultaneous or quasi-simultaneous systems of transmission.

All practical television systems depend upon the phenomenon of the persistence of vision, transmitting the information as to variation in luminance, from point to point of the field of view scanned, in such rapid repetition that the eye cannot follow the variations with respect to the illumination of any given point and sees all of the areas as if presented simultaneously. Where the field is to be represented in three color polychrome it can be shown that it requires that three different types of information must be transmitted to represent both hue and luminosity of each area. Information as to the three quantities transmitted is decoded at the receiver in accordance with the system used. Various quantities may be selected as those transmitted, but it has been shown that whatever quantities are adopted, three are necessary in order to give a reasonably true reproduction, in contrast to transmission of a monochrome picture wherein only one piece of information need be transmitted in order effectively to reproduce any element of the field of view. All of these quantities must be transmitted within the period of the persistence of vision with respect to the particular quantity involved. The most obvious method of transmitting this information is by time division, speeding up the scanning process so as to transmit the information with respect to each of the component colors successively. This has led to various sequential systems, field, line, and dot. Because, however, the frequency band required to transmit all of the geometrical information with respect to each of the colors would be excessive, compromises have been made in all past sequential systems. In the field-sequential system geometrical detail has been sacrificed. In line and dot sequential systems efforts have been made to avoid the effect of flicker by reducing the size of the flickering area so that the flicker would become unnoticeable, but this has been only partially successful and has led to effects of "line crawl" in line sequential systems and "boiling" in dot sequential systems.

Another approach has been through simultaneous or quasi-simultaneous systems. The most obvious of these is the transmission of the three classes of information on three separate carrier waves. If all information as to each color component is to be transmitted in this manner it again requires a band three times as wide as is required for monochrome. Again compromises have been made, of which the most promising heretofore publicized has been to send one signal representative of the luminance and a separate chromaticity signal, modulated on a carrier frequency which is not developed by the normal scanning and not reproducible to any material extent upon the viewing screen of the receiver. Such frequencies are odd-multiples of one-half of the line scanning frequency. Two such carriers might be used to carry the two additional pieces of information required to reproduce the picture, but the cross-modulation products between these carriers are even harmonics of the half line frequency and therefore they are strongly reproduced on the picture field so that this expedient is unsatisfactory.

Therefore, a single chromaticity carrier has been used and subjected to two different types of modulation, i. e., a phase modulation carrying information as to the hue of the area being scanned and amplitude modulation representative of the saturation with rsepect to that hue. By this system a compatible picture may be transmitted on a band width no wider than that required for monochrome. The fidelity of the color reproduction in this latter system is, however, critically dependent upon the phase of the chromaticity signal. Phase distortions in this signal are extremely difficult to avoid, since they may be introduced by multipath transmission of the carrier wave, by transient effects, by the method of modulation used, whether double side band modulation of the chromaticity carrier, which produces minimum phase distortion but requires either a wide band or else results in a lower quality of color reproduction, or single side band which produces color fringes where the color of the field changes.

The system of the present invention involves, in one sense, a combination of sequential and simultaneous systems. There is transmitted, during each field, a signal which represents the luminance of the areas being scanned; except as the signal is modified by motion within the field of view it does not vary from field to field. Coincidentally with the luminance signal there is transmitted a chromaticity signal, modulated upon a subcarrier of the same type which has been used in other systems; i. e. a subcarrier the frequency whereof is an odd multiple of one-half of the line frequency. The subcarrier is modulated as to amplitude only, but the quantity modulated upon it alternates in successive scannings between two values. Since the eye integrates the luminance of the odd and even line scannings, each single line scanned can be considered as representing one-half the luminance of an area two lines in width. The chromaticity signal is modulated in accordance with a code whereunder each amplitude of modulation, with respect to a reference level, is representative of the ratio of the luminance of one of the three component colors to one-half of the total luminance, and the amplitude of modulation, in successive scannings of areas of the same color, alternates between the ratio of one color to one-half the total luminance and the ratio of a second color to one-half of the total luminance. The reference level with respect to which the chromaticity signal is modulated may be any level which remains fixed in transmission; preferably it is some fixed proportion of the amplitude of the black level or blanking pulse which is transmitted at the end of each line and field of the transmitted signal. If no component exceeds fifty percent of the total luminance it makes no difference which two out of the three components are chosen in representing percentage, but if, as frequently happens, fifty percent or more of the luminance is represented by one component (in which case it will be referred to herein as "dominant") the system falls down unless the signal transmitted represents the ratios, alternately, of the other two signals to one-half of the total luminance. Thus, for example, if sixty percent of the luminance of the area being momentarily scanned is green, thirty percent is red and ten percent is blue, the amplitude of the chromaticity signal would be such that in successive scannings of that area the amplitude during the first scanning would represent the percentage of red to one-half of the total, or 30/50= 60% red, whereas in the next scanning the ratio transmitted would be 10/50=20% blue. Averaged over the two scannings the remainder of the signals would be representative of the green. In one sense, therefore, the signals transmitted would represent bi-color sequential signals but the colors in the bi-color would be constantly changing, the first of two successive scannings of a color area representing a portion only of one component and all of a second component; the next scanning of that area would represent the remainder of the common component and all of the third, so that in any entire field all three components may be represented. In any area of different hue the components will change, but since the signal which is reproduced at the receiver is representative of luminance at all times, the fact that the luminance is arbitrarily divided between the two components would make no difference with respect to monochrome receivers.

A preferred method of encoding the chromaticity signal provides that a signal of either zero amplitude or equality with a reference amplitude each represent one component, e. g., blue, without admixture. The signal of one-third the reference amplitude represents a second component without admixture, say green, while a signal two-thirds the reference amplitude represents an unadmixed signal of the third component, in this case red. Under this code chromaticity signals of amplitudes between zero and one-third represent mixtures of blue and green, varying from blue through cyan to green; amplitudes between one-third and two-thirds represent signals varying between green through yellow and orange to red, whereas signals and amplitudes between two-thirds and equality with the reference signal would vary from a pure red at the two-thirds value through the various shades of magenta and purple to a pure blue at equality. Each amplitude therefore represents uniquely a mixture of two only of the three component colors, so that two such amplitudes, transmitted successively by time division, represent any additive color which may be produced by a three color system.

In transmitting signals of this character the reference amplitude against which the chromaticity signal is proportioned is conveniently some definite fraction, say 10%, of the black level of the standard television signal now in use for monochrome. At the receiver the varying amplitude of the chromaticity signal is compared with the black level, and signals are developed, the amplitudes whereof are in the ratio of the relative proportions of the two colors momentarily represented by the chromaticity signal.

There are several methods whereby the resultant signals may be utilized to give a color image, certain of which will be referred to briefly hereinafter. For the purpose of explanation, however, since this specification is directed primarily to the overall system, rather than to the rather numerous types of equipment which may be designed to utilize it, it will be described as it would be employed with a receiver including a cathode ray tube employing three electron guns, each producing an electron beam so directed as to excite one of the primary colors utilized in the system and each with a control grid connected to an individual amplifier. One such tube is disclosed in co-pending application Serial No. 234,190 filed June 29, 1951, now Pat. No. 2,711,493 granted June 21, 1955, of the inventor hereof, but other display tubes of the three-gun type have been described in the literature and the system of the present invention is applicable to any such tube. The amplification factors of the three amplifiers feeding the respective guns are adjusted to inverse proportion to the luminance of the respective primaries, if the efficiencies of the phosphors used are equal; if they are not (as, for example, if the blue phosphor be more efficient than the green), the amplification factors are modified to compensate for this fact. Thus, with one set of primaries which have been found to give good color fidelity, the luminance of the green is approximately six times as great as that of the blue. Were the phosphors used of equal efficiency in the conversion of the energy of the electron beam into a visible form of radiation, the amplification gain of the blue amplifier would be made six times that of the green, but if the blue phosphor were two times as efficient as the green the gain of the blue amplifier would be adjusted accordingly so that the amplification factor applicable thereto would be only three times instead of six times that of the green.

With this arrangement, equal signals supplied to an input of any one of these amplifiers would produce radiation from the phosphors of equal luminance. Before being applied to the control grids of the electron guns, however, the signals from the three amplifiers respectively are each multipled by a factor which is proportional to the relative amplitudes of the signals derived from the chromaticity signal. This multiplication may be accomplished in a separate amplifier or the multiplication may be built into the amplifier already mentioned. It will be seen that at all times there will be one component which has a relative amplitude of zero, and the corresponding amplifier will be biased to cut off. The other two amplifiers will have applied thereto multiplication factors whose sum is unity. The luminance signal is applied equally to the input circuits of all three of the color amplifiers.

As has already been stated the chromaticity signal is transmitted in such manner that the component of dominant luminance is represented in all fields. The components of lesser luminance in any area represented in the transmission are transmitted only in alternate fields. Assuming that the standards of transmission are such that each field transmitted comprises only half of the number of lines representative of the entire picture, where an area of material size and of a given color is being scanned, it is represented on the viewing screen by alternate lines of different color. If the area being scanned is a white of such value that the radiation energy of all three components is equal, green will be the component of dominant luminance and the area will be represented by alternate lines of complementary colors, which in this case would be an orange and a bluish green. If the reproducing field is viewed from a distance at which the picture structure can just be perceived as consisting of individual lines, the resulting sensation will be that of white, since the eye does not resolve color differences as readily as it does difference in luminance or brilliancy. Detail which is smaller than a single line in vertical dimension will be reproduced in one color only, but since, as has been shown, detail is appreciated as difference in luminance only and not in color this will make no difference. If, for any reason, it is believed that the picture should be viewed at such close quarters that the color differences between successive lines can be resolved, by a slight change in synchronizing arrangements, the order of presentation of the colors may be alternated as between successive frames so that, in the case of white, in one frame the odd numbered lines of the field will be orange and the even numbered bluish green while in the next frame the odd lines will be bluish green and the even lines orange. Since the component colors are transmitted as signals of equal luminance this produces no flicker nor crawl, either with respect to color or luminance.

The following detailed description of apparatus embodying the invention as it applies to both transmitting and receiving ends of a television system will make more apparent the principles as set forth above. In the description reference will be made to the accompanying drawings, wherein.

Figures 8A, 8B, 8C:
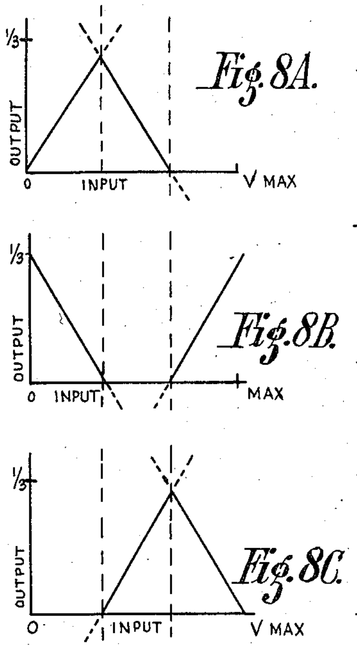
Figures 7A, 7B, 7C:
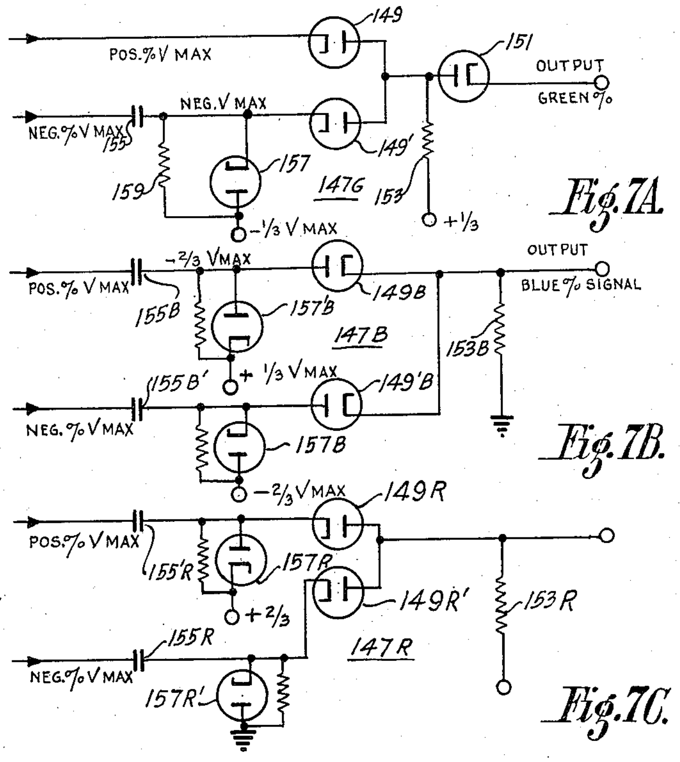
Figure 9:
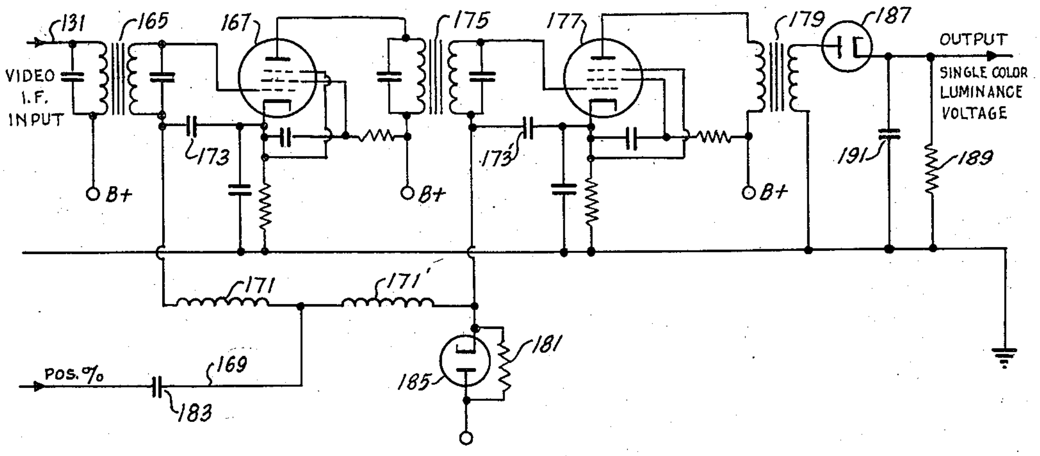

Figs. 7*a*, 7*b*, and 7*c* are circuit diagrams illustrating decoders for selecting, at the receiver, signals representative of each pair of component colors and developing voltages proportional to the respective proportions thereof;

Figs. 8*a*, 8*b* and 8*c* are graphs illustrating transfer functions of the circuits of the various Figs. 7 designated by like letters; and Fig. 9 is a circuit diagram of one form of multiplying unit for varying the amplitude of the signal delivered to a multigun tube in accordance with the proportional factors represented by the currents applied from the decoding unit illustrated in Fig. 8.

Figure 1:
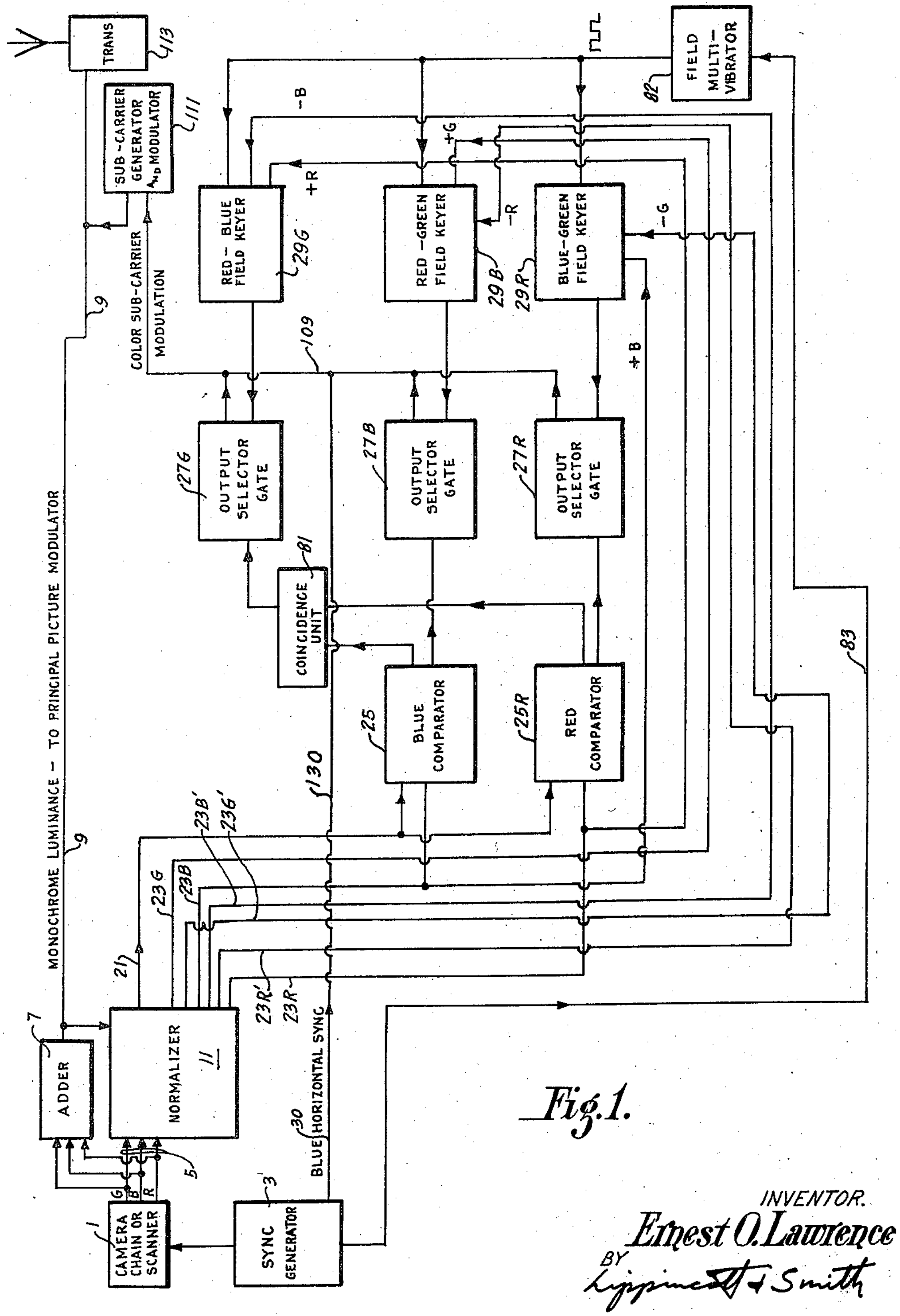
Fig. 1 is a block diagram representing the relationship of the various components employed at a television transmitter for generating color television signals in accordance with the present invention.

Considering first the block diagram of Fig. 1, the reference character 1 designates a source of tri-color signals representative of three primary color components of an additive system. Several cameras for this purpose have been developed and which one is used is of no consequence as far as the present invention is concerned, it being sufficient if the device used develops three separate trains of signals, each representative of the intensity of the component colors of the successive individual areas being scanned. Alternatively, instead of the camera the element 1 may represent a flying spot scanner for films or slides which will develop similar trains of signals representing a field of view. As used in all present day color television systems this camera or signal generator is assumed to include means for balancing the intensity of the separate signal trains produced so as to compensate for filters of varying efficiency or transmission characteristics. In this case, however, the signals are balanced further so that, in scanning an area illuminated by white light, the signals generated are in proportion to the relative luminance of the three components of such white light rather than the energy of the component radiation. For purposes of the ensuing description it will be assumed that the primary components are so chosen that the three signals, in scanning an equal-energy white, bear the proportions 6, 3, and 1, of green, red, and blue respectively.

Feeding the element 1 is a "sync generator" 3 of the type conventionally used to provide synchronizing signals in monochrome systems. Since this, also, is perfectly conventional it is not considered necessary to describe it in detail.

The signal generator 1 has three individual output circuits collectively designated as 5, and individually designated as G, B, and R respectively, for carrying the green, blue and red signals. From each of the leads 5 is taken off a branch lead which feeds an adder or summing circuit 7. Such circuits are also conventional. The individual trains of signals are combined in the adding circuit to produce the luminance signal which is fed through a lead 9 to the principal modulator of the television transmitter or to an equivalent transmission line if the radio transmission is not to be used from the point where the signals are generated.

The leads 5 feed a normalizer 11, the function of which is to determine the relative proportions of the three individual signal trains in the combined luminance signal. These proportions are determined continuously in accordance with the instantaneous amplitudes of the three signal trains, but, because of the lack of resolution of the eye with respect to color in detail, it is not essential or, in the usual case, even desirable that its response be instantaneous. Thus, if the maximum frequency which can be modulated upon the television transmitter be four megacycles, it is sufficient if the response time of the normalizer corresponds to two megacycles or even less.

Figure 3:
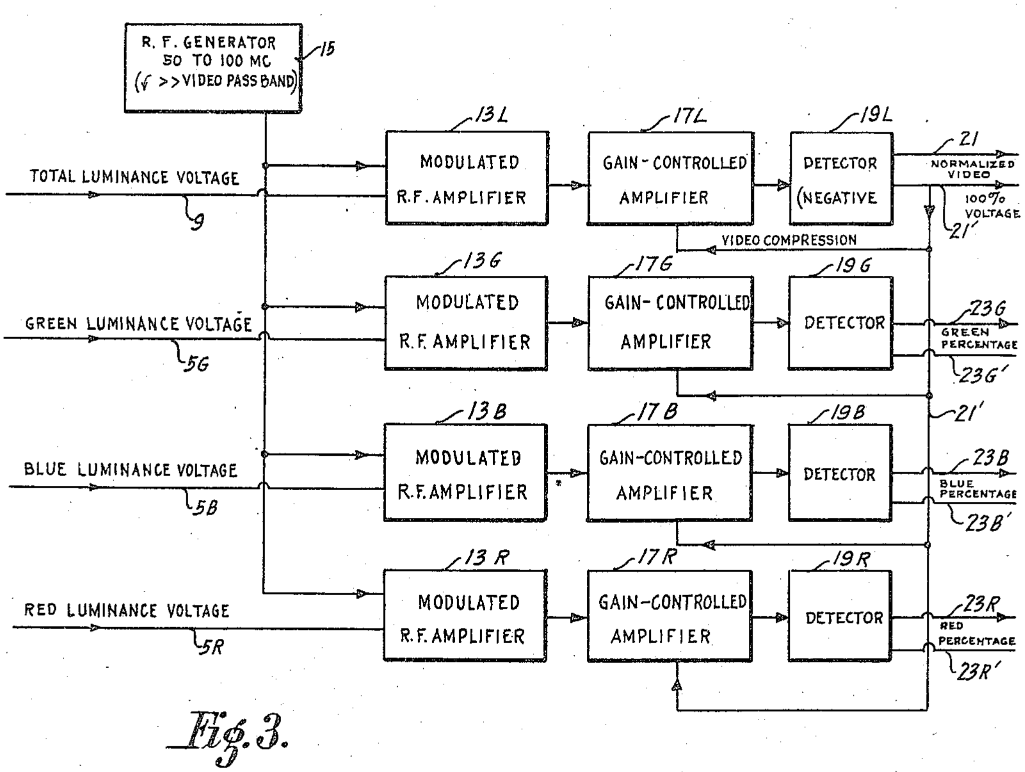
Fig. 3 is a more detailed block diagram of the elements utilized in one method of obtaining signals proportional to the relative percentages of the various color components.

The form of normalizer employed may differ in different cases. One satisfactory arrangement is illustrated in block in Fig. 3. Connections from the lead 9, carrying the total luminance signal, and the leads G, B, and R of the group 5 are illustrated at the left of the diagram. The signals carried by these leads are fed to four similar modulator-amplifiers 13, 13G, 13B and 13R, which modulators are also fed by a high frequency oscillator 15, preferably operating at a frequency from fifty to one hundred megacycles. The modulators each vary the amplitude of the high frequency oscillation fed thereto in accordance with the amplitude of the total luminance and color signals respectively. The output of the various modulator-amplifiers each are fed to gain controlled amplifier 17L, 17G, 17B and 17R respectively. These amplifiers could be substantially identical, each comprising variable-mu tubes, the amplification whereof varies in accordance with bias potentials applied to their grids, decreasing as this bias becomes more negative. Each of these amplifiers feeds a detector; amplifier 17L feeds a detector 19L, which derives, from the amplitude of the modulated signal, a demodulated or detected component which is fed, through a lead 21 and its various branches, to control the gain of all of the variable-gain amplifiers, the detector 19L being so poled that increased amplitude develops a greater negative potential and thus lowers the gain of all of the amplifiers to which it is fed. As is well known, with such a feed-back arrangement, the total output amplitude may be held to a constant within limits as narrow as may be desired. Since the gains of all of the amplifiers are varied equally and simultaneously, the detected signal from amplifier 17L and detector 19L, as supplied by the lead 21, represents a reference voltage corresponding to one hundred percent of the luminance signal. The outputs of detectors 19G, 19B and 19R are in proportion to the relative percentages of green, red, and blue in the luminance signal. Preferably each detector is adapted to deliver equal percentage signals of both positive and negative polarity, but alternatively several detectors may be coupled in parallel to each amplifier output, or inverting devices may be used to make equal positive and negative signals available.

These signals are delivered through leads 23G, 23B and 23R in positive polarity, the negative signals are delivered through leads 23G', 23R' and 23B'.

Turning back to Fig. 1, the leads 23B and 23R carrying the positive signals divide into two branches. One branch from each of these leads feeds through a comparator, 25B and 25R, to an output selector gate, 27B and 27R respectively. The other branches of the positive leads 23, plus lead 23G and the negative leads 23' feed field keyers 29G, 29B and 29R as will be described below.

Figure 4:
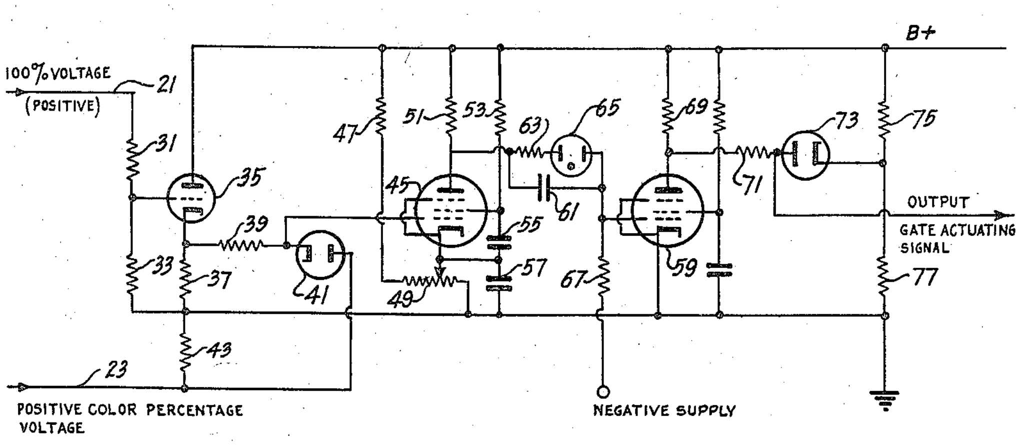
Fig. 4 is a schematic diagram of a form of circuit for comparing the amplitude of one component to a reference amplitude, in order to determine which component is dominant in the luminosity signal.

Comparators 25B and 25R are identical in construction, so one description will serve for both. Taking comparator 25B as typical, it is illustrated in Fig. 4. As shown in this figure, and also in Fig. 1, it is supplied by the positive reference signal from detector 19L as well as the positive blue percentage signal from lead 23B.

In the particular type of comparator illustrated in Fig. 4 the voltage representing 100 percent signal is applied positively through a voltage divider comprising a pair of equal resistors 31 and 33 in series, the low potential end of resistor 33 connecting to ground or neutral. A tap taken from the midpoint between the two resistors connects to the grid of a triode 35, connected as a cathode follower having a cathode resistor 37, of relatively high impedance, connecting to ground. As is well understood, there will be developed across resistor 37 a potential which is substantially equal to the potential applied to the grid of tube 35. A resistor 39 connects from the cathode of the tube 35 to the cathode of a rectifying element such as a diode 41. The positive color-percentage voltage from lead 23 is applied to the anode of the rectifier. A load resistor 43, across which the percentage voltage is developed, connects from the lead 23 to ground.

Voltage at cathode of tube 35 is ½ of 100%, or 50%. When the positive color percentage is less than 50%, diode 41 is biased off, and pentode 45 is held cut off by the positive voltage on its cathode. Therefore, no current flows through resistor 39, and 50% voltage appears at grid of 45. When color percentage voltage exceeds 50%, current is drawn through diode 41 and resistor 39, raising the potential of grid of pentode 45 and causing tube 45 to conduct. This makes a positive gate at the plate of pentode 59.

The cathode of tube 45 is biased to a positive potential through a voltage divider comprising, in series, a resistor 47 and potentiometer 49, connecting between the positive voltage supply and ground. The variable contact of the potentiometer is adjusted so that, when diode 41 is not conducting, tube 45 is biased to cut-off. The plate load of tube 45 is a resistor 51, connecting from the anode to the B plus supply voltage. Screen grid potential for the tube is supplied through a dropping resistor 53. The screen grid is held substantially at ground potential with regard to A. C. voltages by means of bypass condensers 55 and 57 in series, connecting to ground. A. C. ground is also provided for the cathode by connection between these two condensers.

Voltage variations developed across the resistor 51 are further amplified by a tube 59, also a pentode. A. C. coupling between the anode of tube 45 and the control grid of pentode 59 is provided through coupling condenser 61. D. C. coupling is through a resistor 63 and a gaseous conducting bulb such as a neon bulb 65 in parallel with the condenser 61. A resistor 67 leads from a control grid to a source of voltage sufficiently negative with respect to the B-plus lead to maintain the bulb in conducting condition at all times; such an arrangement prevents drift of the bias on the control grid of tube 59 which might result in varying potential in the output of the latter giving false comparison signals.

The comparison signals from the amplifier 59 appear as variations in potential across an anode resistor 69. These potential variations are supplied through a resistor 71 to a clipper such as a diode 73, the signals being applied to the diode anode. The cathode is biased from the B-plus lead through a resistor 75 in series with a second resistor 77 and ground. When tube 45 conducts, the control grid of tube 59 swings negative, reducing the current through the latter tube and swinging its plate positive. Both tubes 45 and 59 are high gain tubes, so that the signal produced when color percentage voltage fed through lead 23 exceeds the 50 percent value would be much greater than that necessary to actuate the selector gate fed by the comparator. The clipper limits the excess peaks, and causes a substantially square-top signal to be effective to actuate the selector gates, and as a result there is no uncertainty as to which gate is effective, since it is obvious that only one signal at a time can exceed the fifty percent value.

Each of the comparator units applies an output signal through its corresponding selector gate 27 and a like signal to a coincidence unit 81. Since the comparator units generate a gating signal only when the percentage input signal exceeds 50 percent of the reference value, it will be apparent that there would be occasions when none would supply a gating signal even if a green comparator were provided. Under these circumstances it is of no importance which signal is selected as the "dominant" signal, the luminance value whereof is divided between two fields. Accordingly the circuit is so arranged that the green gate 29G is normally in condition to pass signals, while gates 29B and 29R pass signals only when their corresponding comparators actuate them. When either of the latter is actuated the coincidence unit passes on a signal which opens the circuit through gate 27G. Hence green is treated as if it were dominant in case there is no component having a luminance in excess of 50 percent of the total; this case is purely arbitrary, however, and either of the other signals could be selected for this purpose if desired. The coincidence unit is of conventional type, which is used in numerous radar and comparable application, and applies a gating potential to the green selector gate at all times except when a gating pulse is received from either the blue or red comparators. Because of this arrangement there is no need for a green comparator.

The signals delivered from the comparators operate, either directly or through the coincidence circuit 81, to actuate selector gates 27 and through the latter switch signals from one or the other of field keyers 29 into the output circuit of the coding device. The field keyers operate to select alternately the two subdominant color components which are to be represented in combination with the dominant component in successive fields. The selection is made under the control of a field multivibrator 82. This is a standard bi-stable multivibrator of the Eccles-Jordan type, which is triggered at the beginning of each field by a vertical synchronizing pulse derived from the sync generator 3 through a lead 83. Since this type of equipment is well known it is not illustrated in detail, it being sufficient to state that the control pulses are taken from two plate resistors each of which supplies pulses which are relatively positive and negative as the two tubes of the multivibrator are alternately rendered conducting and nonconducting, one tube furnishing positive pulses while the other is supplying negative pulses and the polarity reversing at each field. The one multivibrator controls all of the field keyers.

The three field keyers 29G, 29B, and 29R are identical in construction and differ only in adjustment. Therefore, for purposes of illustration, only the keyer 29G is shown. This keyer consists of a pair of pentodes 85, 85′, the anodes of which are connected in parallel to a load resistor 87. Type 6AS6 tubes have suitable characteristics. Each is supplied with a potentiometer-type cathode resistor 89, 89′. The control grids are shown, for simplicity, as being fed directly from detectors 19R and 19B respectively. The detectors are of conventional form, detector 19R connecting across a load resistor 91, one end of which connects to the movable contact of potentiometer 89. Resistor 91 is in itself a potentiometer, the sliding contact of which connects it to the control grid of tube 85.

The suppressor grids of the tubes 85 and 85′ are fed respectively from the two phases of the field multivibrator 81 through resistors 93, 93′. Diodes 95 and 95′ connect the suppressor grids of the pentodes to their respective cathodes, these diodes being connected to conduct when the suppressor grid swings positive, thereby bringing suppressor grids and cathodes substantially to the same potential, the normal condition for operation of tubes of this type. When a negative pulse is received from the multivibrator, however, diodes 95 are nonconducting and therefore the suppressor grid swings negative with respect to the cathode, resulting in an entire blocking of current through the tube receiving the relatively negative pulse. Each of the pentodes 85 and 85′ will therefore conduct only in alternate fields. The function of the field keyers is to develop signals of the proper amplitude to represent the relative percentages of dominant and subdominant components to be reproduced in the respective fields. Field keyer 29G, here illustrated, feeds these signals through its selector gate only when the dominant component is green. If the color to be reproduced is a saturated green, without admixture of a subdominant component, the signal to be transmitted on the chromaticity carrier must be one-third of the reference amplitude. In adjusting the keyer, therefore, the contact of the potentiometer 89 is so adjusted that with current from tube 85′ cut off, and no signal from detector 19R, the current carried by tube 85 is sufficient to cause a drop of one-third of the reference amplitude across resistor 87. The contact of potentiometer 91 is then adjusted until, with a fifty-percent red signal, the current through tube 85 is doubled.

A similar adjustment is made with respect to the output of tube 85′; the value of the current passed by this tube in the absence of a blue signal is made equal to that of tube 85 in the absence of a red signal, but since the blue signal is applied negatively potentiometer 91′ is adjusted so that fifty percent blue carries the tube to cutoff. It will be recalled that a green signal is considered as dominant except when either the blue or the red signals exceed fifty percent. Therefore a fifty percent red or a fifty percent blue is the greatest percentage of these components that the keyer 29G can be called upon to supply. If the luminance of a signal is fifty percent blue, for example, the fields as reproduced at the receiver will be alternately of pure blue and pure green. Since, in a blue-green field, blue is represented by a zero amplitude chromaticity signal, cutting off the blue tube during the field in which it is normally conductive will result in such a zero signal. Intermediate values between blue and green will give varying amplitudes between zero and one-third of the reference value. Similarly, since the red signal is added to the green norm by keyer tube 85, the latter will deliver signals varying between one-third and two-thirds of the reference amplitude, the latter representing a pure red field.

Blue-green field keyer 29R is adjusted so that, without a signal from either the red or green detectors, the current through resistor 87 will be two-thirds of the reference value. In this case the blue signal is applied positively and is of such value that a fifty percent blue signal would carry the tube current to full reference amplitude, which is one of the two amplitudes which represents blue. The green signal is applied negatively and is of such value that fifty percent green will carry the output down to one-third reference value.

The red-green keyer varies from the other two in that the potentiometers corresponding to 89 and 89′ are set to give different outputs in the absence of signal. The tube to which the red signal is applied, negatively, is set to give a normal current of full reference value, whereas the tube to which the green signal is applied positively is normally biased to cutoff. A fifty percent red signal therefore carries the first mentioned tube down to two-thirds reference value whereas a fifty percent green signal carries the other tube up to one-third reference value.

It will be realized that in every case the keying tubes may develop signals which are outside the limits given, since the percentage signals are supplied to them at all times. These excessive signals, be they greater or less than those which would actually be desired, are never used, since the outputs of the keyers are controlled by the output selector gates 27.

From the above it will be seen that the outputs of the various field keyers are as follows, "$V_{max}$" signifying the amplitude of the reference voltage:

Red-blue field keyer:
Odd field=one-third $V_{max}+(\frac{1}{3}V_{max}\times 2R\%)$
Even field=$\frac{1}{3}V_{max}-(\frac{1}{3}V_{max}+2B\%)$
Red-green field keyer:
Odd field=$V_{max}-(\frac{1}{3}V_{max}\times 2R\%)$
Even field=$\frac{1}{3}V_{max}\times 2G\%$
Blue-green field keyer:
Odd field=$\frac{2}{3}V_{max}+(\frac{1}{3}V_{max}\times 2B\%)$
Even field=$\frac{2}{3}V_{max}-(\frac{1}{3}V_{max}\times 2G\%)$ In the above the designations "odd field" and "even field" are without significance except that they indicate different, successive fields. Actually it makes no difference whether a given output of the field keyers occurs on the fields comprising the odd or even lines, as long as the different signals are transmitted successively.

Figures 5, 6:
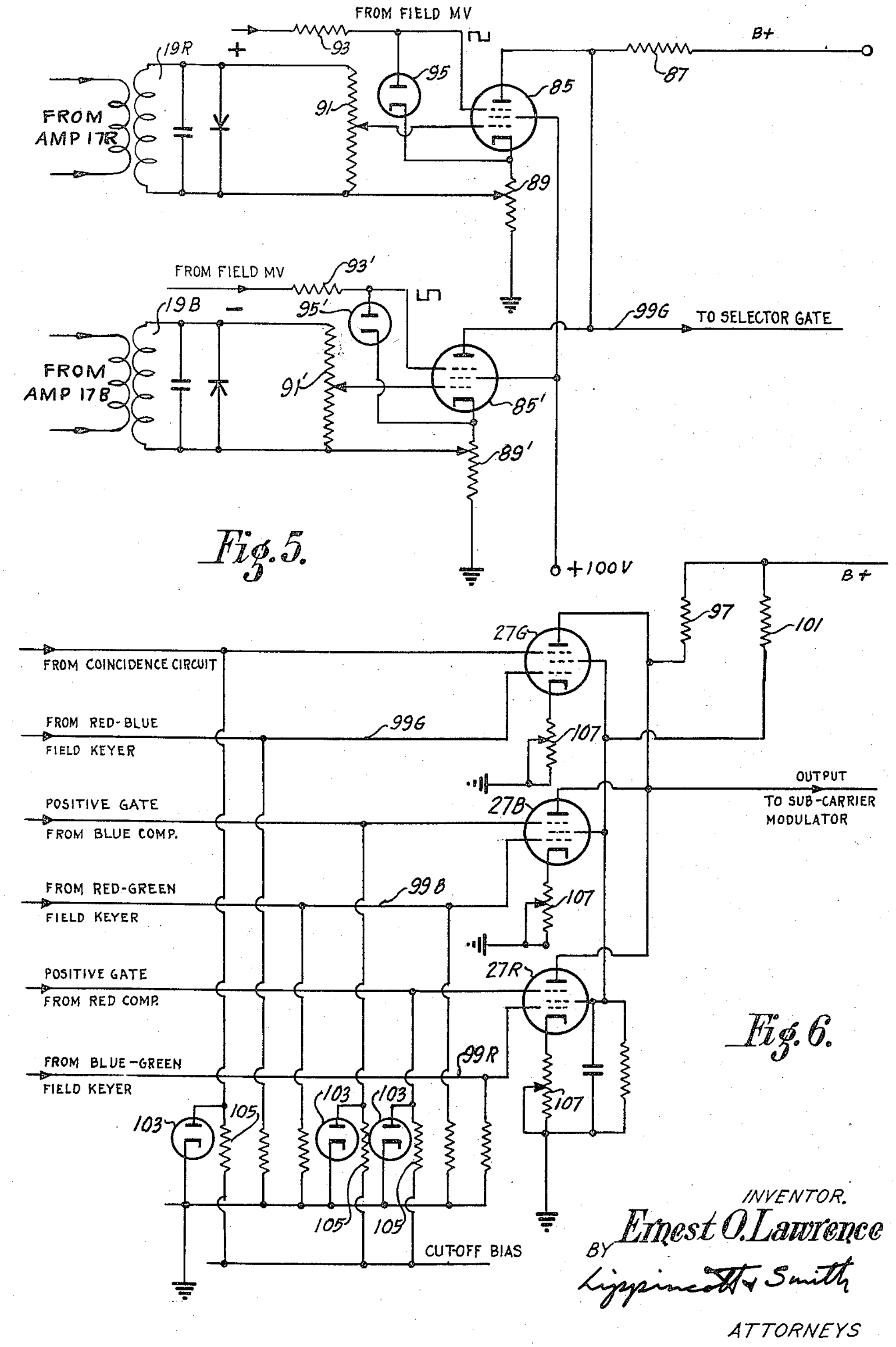
Fig. 5 is a schematic diagram of the circuitry utilized in one form of keyer for developing chromaticity signals representative of the proportions of the dominant and subdominant color components, and transmitting signals representative thereof in alternate fields.
Fig. 6 is a circuit diagram illustrating one form of selector gate for determining which keyer is to be actuated during the scanning of a particular picture element or group of elements.

The selector gates are illustrated in Fig. 6. Each gate comprises a pentode, such as 6AS6. Tubes 27B and 27R are normally biased to cutoff; they conduct only when a positive pulse is received from a corresponding comparator and applied to their respective suppressor grids. Tube 27G is normally conducting, but it ceases to conduct when a negative pulse is received from the coincidence circuit. The anodes of all of the gating tubes are supplied through a common load resistor 97, the plates of these tubes being connected in parallel. The control grids of the three gating tubes are supplied with signals from their corresponding keyers through leads 99G, 99B, and 99R respectively. The screen grids are also supplied in common from the B+ power source through a dropping resistor 101. Diodes 103 connect from the suppressor grid of each of the tubes to their respective ground to bring these elements to like potentials when positive potentials are supplied to the suppressor grids, in the same manner as in the case of the field keyer tubes. All of the suppressor grids are supplied with a cutoff bias from a common negative source through resistors 105. In the case of tube 79G, however, this bias is overcome by a positive potential supplied from the coincidence circuit but establishes itself as soon as this circuit is actuated. The output current of the tubes is adjusted to equality at equal inputs by varying the position of the contacts on the cathode potentiometers 107. The output from the selector gates is supplied to a subcarrier modulator through lead 109.

The output signal is supplied through lead 109 to a subcarrier generator and modulator 111. This modulates the chromaticity signal on a subcarrier which is an odd multiple of the half line frequency, preferably a multiple which is easily factorable, such as the 507th harmonic, leading, with a line frequency of the present standard of 15,750 cycles, to a subcarrier frequency of just under 4 megacycles. The modulated subcarrier is added to the monochrome luminance signal and fed either to a transmission line or to a picture modulator and transmitter 113 in accordance with usual practice. The modulation upon the subcarrier and the choice of the subcarrier to be used are not described in detail, since this technique, broadly, has been used in connections with other color systems and is now well known. The resultant signal differs, however, from those modulated on similar subcarriers in former systems in that it is its amplitude only which is of moment, its phase being of no effect as far as the receivers and the colors reproduced thereby are concerned.

Numerous references have been made herein to the reference amplitude of the chromaticity signal. To a certain degree this value is arbitrary. Since the chromaticity signals are superimposed on the luminance signals, and their amplitudes may, on occasion, be added arithmetically to the maximum amplitudes of the latter, they must not be of sufficient amplitude to cause overmodulation of the main signal carrier. One reference amplitude which is always transmitted, at the end of each scanning line, is the blanking signal which establishes the black level at the receiver. A certain percentage of this black level, say 10%, may be taken as the reference level for the chromaticity signal. As will be shown later the usual block level pulse may be used at the receiver for reference purposes.

Preferably, however, the desired percentage of the blanking pulse developed by the sync generator at the end of each line is fed, via lead 130, directly to lead 109 and the subcarrier modulator. The duration of this pulse and the epoch of the blanking period at which it is transmitted are details which are not important from the point of view of the invention itself, although they may be from the aspect of standardization. If the pulse is applied to the "front porch" of the line sync pulse its effect will, in general be to put a dark blue border (about 5% of the maximum luminance) at the right hand edge of the picture. This may be advantageous from the point of view of giving a reference color but with some types of line sync equipment it may lead to premature tripping of the horizontal oscillator. If it occurs on the "back porch" of the sync pulse it will increase the background illumination at the black level by from 0.5% to 0.7%, which is much less than the ordinary effect of ambient light. Except at black level, where increase in brightness in one frame is not compensated by a corresponding decrease in the next frame the presence of the chromaticity pulse will have no visible effect. Since the pulse is not required for any synchronizing effect, but merely to set the reference level, the reason for transmitting it is merely to simplify receiver circuitry by eliminating the necessity of gating the black level pulse. If its effects on the return lines proves visible to any material percentage of viewers it can be dispensed with.

Figure 2:
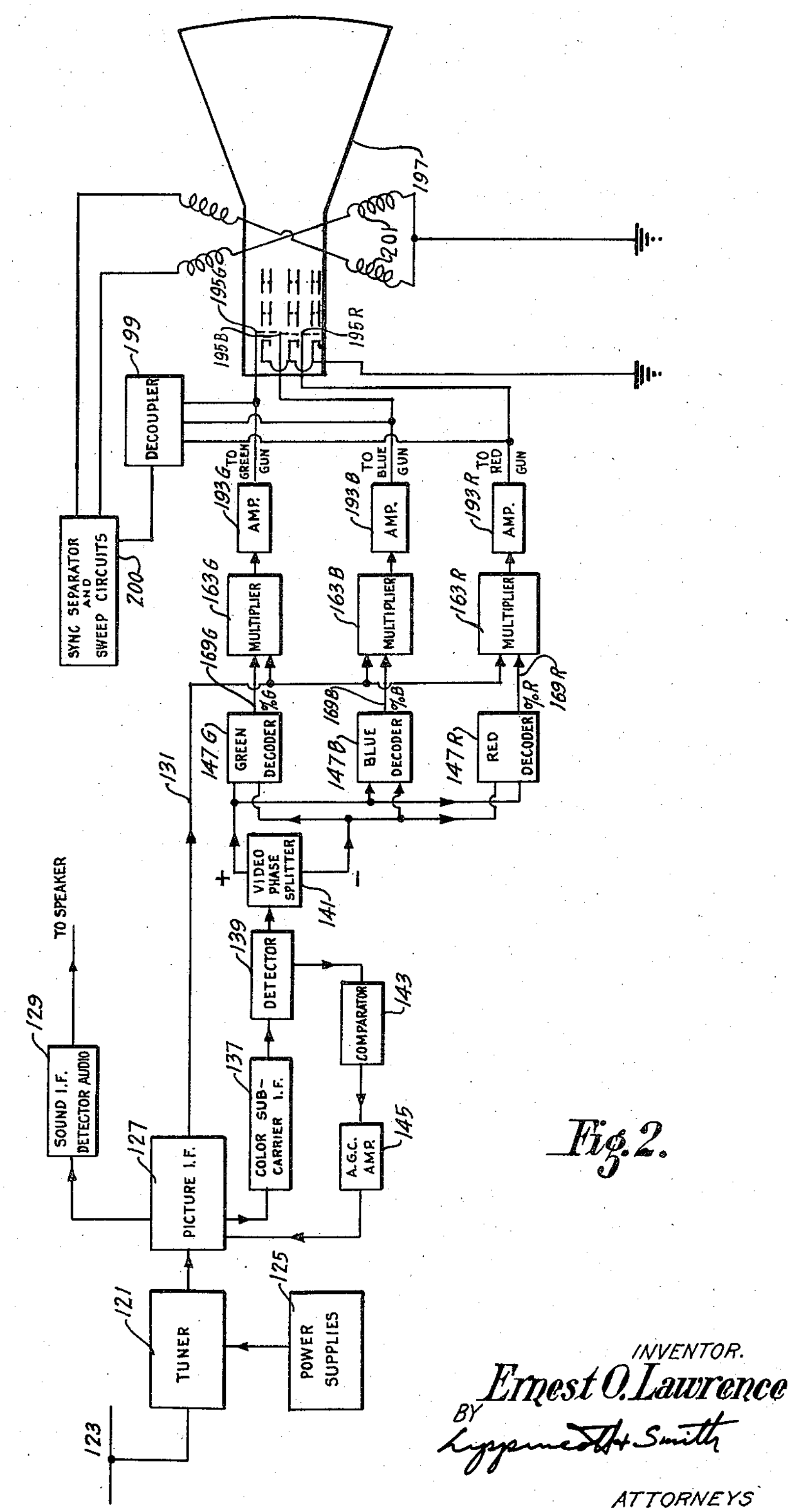
Fig. 2 is a similar block diagram showing the relationship of components comprising a receiver for such color television signals.

A suitable receiver for color signals of the type contemplated by this invention is illustrated in block form in Fig. 2. In this figure a tuner 121, fed by an antenna 123, and the accompanying power supplies 125 are purely conventional, and may be of identically the same form as would be employed in a monochrome receiver. Signals from the tuner are fed to an intermediate frequency amplifier 127, in which the accompanying sound is separated and passed to element 129 for further intermediate frequency amplification if necessary, and detection. This is also conventional and has no direct relation to the present invention. The picture intermediate frequency is passed on through lead 131 to be operated on by the color selecting equipment hereinafter to be described, but up to this point this, too is in accordance with usual practice.

The picture I. F. amplifier 127 includes a filter for separating the color subcarrier, which bears the coded chromaticity information, from the combined signals. If desired, the modulated subcarrier may be further amplified in an intermediate frequency amplifier 137, and thence fed to a detector 139. This may be a twin detector yielding positive and negative signals of equal amplitudes, or it may be an ordinary detector which feeds a video phase splitter 141 for accomplishing the same purpose. If the blue reference pulse is transmitted together with the horizontal sync pulse, as described in connection with the transmitter, these pulses may be fed to a comparator 143, amplified in an AGC amplifier 145 and fed back to control the gain of the picture I. F. amplifier 127. Alternatively, this may be done in the usual fashion from the black level pedestal of the sync pulses and since it is believed the action of the elements in this loop is quite obvious it will not be described in detail, it being believed sufficient merely to indicate the possibility of this type of automatic gain control.

The equal positive and negative signals from the detectors or the phase splitter 141 are fed in parallel to three decoders, 147G, 147B and 147R. The purpose of these decoders is to develop signals which are proportional to the relative percentages of luminance indicated by the chromaticity signal. The details of the decoders are shown schematically in Figs. 7*a*, 7*b*, and 7*c*, and the respective response curves of the three decoders are illustrated in Figs. 8*a*, 8*b*, and 8*c*. The outputs of the decoders are signals to be applied as multiplying factors to determine the percentage of the instantaneously transmitted luminance signal with respect to the various color components. The signals delivered should therefore vary linearly with the amplitude of the chromaticity signal over the specific ranges represented by the code. Thus for a chromaticity signal between zero and one-third of the reference amplitude the green percentage signal should vary between maximum amplitude and zero while the blue percentage signal varies between zero and maximum amplitude, the sum of the two being a constant. Between one-third and two-thirds of the reference amplitude the green percentage signal must vary between maximum and zero while the red signal varies between zero and maximum. Finally, between two-thirds and unity of the chromaticity signal as compared to the reference signal the red percentage varies between maximum and zero while the blue percentage signal varies between zero and maximum.

Considering first the green decoder, 147G, illustrated in Fig. 7*a*, it comprises a pair of switching diodes 149 and 149', having their anodes connected together and also to the anode of an output diode 151. The common anode connection is biased to a potential of one-third the reference value through a resistor 153, which may be of the order of 500,000 ohms resistance. A lead carrying the positive chromaticity signal connects to the cathode of diode 149 directly. The lead carrying the negative chromaticity signal connects to the cathode of diode 149' through a condenser 155 of a capacity of the order of 0.1 microfarad. A clamp-diode 157 has its cathode connected to the cathode of diode 149' and its anode connected to a source of negative potential of the value of one-third of the maximum reference signals. A leak resistor 159 connects across the diode. The leak may have a value of about 68,000 ohms, giving a time constant to the circuit comprising the leak and the condenser 155 of something less than 1/100 of a second. This is to be compared with a line frequency of 1/15,750 second, so that the discharge of this circuit during the period required to scan one line is small enough to be neglected. It is only this latter fact which is critical about the values given for the circuit constants. The output potential from the decoder is delivered to the succeeding apparatus as positive pulses through output diode 151.

It will be recalled that a signal of reference amplitude is preferably transmitted during the blanking period of each line, but it is also possible to derive reference value signals from a keyed AGC from the black level of the line sync pulses. In either event positive and negative pulses of this value are applied to the two input circuits of the decoder during this interval. The positive pulse does not pass diode 149, since it is applied to the cathode. The negative pulse, however causes diode 149' to conduct, and, to the extent that it exceeds voltage applied to the anode of the clamp 157 also causes the latter to conduct, limiting the value of this pulse, as applied to the cathode of the tube 149', to minus one-third $V_{max}$. When the pulse ceases, if the amplitudes of the chromaticity carrier drops back to zero, there will therefore be left on the condenser 155 a potential of plus two-thirds $V_{max}$, which cannot leak off except, too slowly to be apparent, through the leak 159. The positive pulse also drops to zero at the same time. The plus one-third $V_{max}$ potential applied to resistor 153 therefore is connected to ground through tube 149 and since the impedance of the latter tube is negligible in comparison to the high impedance of the resistor, the anodes of tubes 149, 149' and 151 are effectively grounded. Since, as will be noted from the graph of Fig. 8*a*, the output should be zero for this value of the chromaticity pulse, this is what is desired. As the chromaticity pulse rises from zero value toward plus one-third $V_{max}$, the anodes of the three tubes connected to resistor 153 rise in potential accordingly, since the capacities of these anodes are so small that the time constants would be considered negligible. With a chromaticity signal of one-third $V_{max}$ a signal applied to the input side of condenser 155 becomes minus one-third $V_{max}$ and with the charge accumulated upon the condenser equal to plus one-third $V_{max}$ the potential applied to the anode of tube 149' and that applied to its cathode are equal, so that a maximum signal is still delivered across the output tube 151. Tube 149 is no longer conducting, since the potentials across it also balance at this value. If the chromaticity signal continues to increase the cathode of tube 149' becomes more negative, so that the anodes of the tubes follow the negative pulse down, reaching zero when the negative pulse reaches two-thirds of its maximum negative value. Since the output tube 151 can only pass positive pulses, further drop to a value of minus $V_{max}$ gives no output signal. The characteristic curve of the output therefore varies in accordance with the desired law, rising from zero to full value at one-third chromaticity amplitude and dropping to zero again at two-thirds.

The blue and red decoders 147B and 147R operate in accordance with the same general principles but differ in detail because of the desired different characteristics. The reference pulses at the beginning of each line trap charges on condensers 155B and 155'B respectively which drops the potential on the output side of condenser 155'B, with respect to its input side, to minus two-thirds $V_{max}$ and raises the potential on the output side of condenser 155'B by an amount equal to one-third $V_{max}$. As the potential of the chromaticity signal drops to zero, the negative side of the line applies a positive potential to the anode of tube 149'B which causes a full output signal to appear across resistor 161B. The potential of the ungrounded end of this resistor only becomes zero when the negative input amounts to one-third reference value; thereafter tube 149B ceases to conduct. The positive side of the circuit is still one-third $V_{max}$ negative at 1/3 reference level applied to condenser 155B, so no conduction occurs through tube 149B and no signal appears across output resistor 153B until the chromaticity signal has reached two-thirds $V_{max}$, after which tube 149B conducts increasingly until the positive signal reaches $V_{max}$, giving the characteristic transfer function illustrated in Fig. 8B. Similar reasoning shows that decoder 147R will give the transfer function illustrated in the graph of Fig. 8C.

The signals from the three decoders, together with luminance signals, are fed to the multipliers 163G, 163R, and 163B. The function of these multipliers is to provide, in the output of each, a signal which is equal to the luminance signal multiplied by the percentage factor represented by the outputs of the various decoders, so that the sum of the outputs of the multipliers is equal to the original luminance signal, always remembering, however, that only two of the multipliers at most will be receiving a percentage signal at any one time. The multipliers are preferably identical. Various types are possible, since modulation is, in fact, a multiplication process. A form of multiplier which illustrates the desired operation is shown in Fig. 9. This particular device uses, in cascade, two variable-mu tubes. Suitable tubes for this purpose are those designated as 6BH6, the transconductance of these tubes, when supplied with a 150 volt bias on the screen grid, varies substantially linearly with control grid bias over a range of more than 10:1. Hence by using two of these tubes in cascade, and applying the percentage luminosity signal simultaneously to the grids of both tubes as a bias potential, a 100:1 percent variation in gain may be obtained, which is sufficient to render the arrangement entirely satisfactory for the purpose.

In the arrangement shown, the I. F. luminance signal is applied from amplifier 127 through lead 131 to a conventional I. F. transformer 165. The high potential side of the secondary of this transformer connects to the grid of the first multiplier tube 167. The low potential side of this transformer connects to input lead 169 carrying the percentage signal from the decoder. A small inductor 171 in series with the lead 169 and a condenser 173 form, in effect, a low pass filter cutting off at, say, one to two megacycles, varying the bias at this rate, with the I. F. video signals superposed on this bias level. Tube 167 feeds a second amplifier of substantially identical construction, comprising input transformer 175, tube 177 and output transformer 179. Anode and screen grid biases for both tubes are applied in conventional manner. The percentage signal from lead 169 is applied to the control grid of tube 177 through a choke 171', with high frequency bypass to ground through condenser 173' in the same manner as has already been described in connection with tube 167. Normally the control grids of both tubes are biased substantially to cut off through a resistor 181. This should be of high impedance with respect to the output impedance of the decoders. A blocking condenser 183, in series with the feed line 169 from the decoder, prevents the bias potential from being passed back to the decoder itself, and a diode 185, bridging resistor 181, provides against any possible accumulation of a negative charge upon the condenser from the grids of the two multiplier tubes when the latter swing positive.

The multiplied I. F. signals from the output of the multiplier are detected, for example by a diode 187 connected to the secondary of transformer 179, feeding into a conventional circuit comprising a resistor 189 shunted by an integrating condenser 191. The output, it will be seen, represents the luminance of one color only. This signal is supplied to amplifiers 193G, 193B, or 193R as the case may be. The gains of these amplifiers are adjusted in inverse ratio to the relative luminance of the three primary components of the luminance signal, times the efficiency of the phosphors used on the target on the particular display tube employed in the receiver. If, as originally assumed, the primaries have luminance ratios of $B=1$, $R=3$, and $G=6$, the gains of amplifiers 193G, 193R, and 193B must be, respectively in ratios 1, 2, and 6, assuming equally efficient phosphors. This also assumes that the phosphors used match accurately the filters employed in generating the original signals. Under these circumstances, taking into account the varying sensitivity of the eye, equal luminance signals of the three components will produce equal sensations of brightness in the eye and these signals can be changed from color to color without producing the sensation of flicker. These three signals are therefore fed to the control grids 195G, 195D, and 195R of a three-gun cathode ray tube 197, which may be of the type illustrated in the copending application of the same inventor Serial No. 234,190, entitled Direct View Color Tube.

The detected signals from all of the amplifiers 193 are fed through suitable decoupling circuits (or buffer amplifiers) 199 to conventional sync separator and sweep circuits 200, which provide deflecting currents for the display tube 197 through vertical and horizontal deflecting coils 201.

As has been indicated, the ideal relative gains of the amplifier 193 may actually require adjustment over a considerable range in order to compensate for phosphors of different efficiencies. Further adjustment may be required if the control grids of the various guns of the display tube have different characteristics. Furthermore, it may be found desirable still further to vary the ratios of the amplifiers 193 in order to achieve better color fidelity in case the phosphors differ in the hue of their emitted light from that selected by the filters at the transmitter. This latter variation will necessarily disturb, to some degree, the equal luminance characteristics of the signals. It has been found by experiment, however, that at the 30 cycle rate-of-change of the colors presented in accordance with this invention some difference in luminance is tolerable. A change in total signal amplitude of the blue, for instance, because of its low luminance, has a relatively slight effect in producing flicker although it may result in a marked difference in hue. A change in the green signal might be expected to have a very much larger effect. In the great majority of cases, however, the green will be the dominant component, and reproducing white, where the luminance is always greatest, the green signal will be divided to form two-fifths of the green-red signal and four-fifths of the green-blue signal. A change in the luminosity in the green will therefore affect the green-blue signal to twice the extent that it affects the green-red signal. It will, however, affect the latter. If, therefore, the green signal is changed by ten percent above its equal-luminance value, the difference in luminosity in successive fields will only be about four percent. For most observers this is tolerable. Still considering an equal intensity white signal, a change of ten percent in the red will produce a six percent variation in the luminance of successive fields, which may or may not be tolerable. The limits of such adjustments as these are dependent upon other factors, such as the total maximum brilliance of the screen, the amount of ambient light, etc. The ideal is, of course, equal-luminance signals and identical hue in transmitter and receiver primary colors, but since color is a sensation it is unnecessary to deal in absolutes and the degree of adjustment here indicated therefore offers the opportunity to obtain colors giving the most pleasing picture even though a match of primary colors at transmitter and receivers may not be obtainable due to causes outside of the factors to which this invention primarily relates.

The foregoing description has emphasized the application of this system of color information transmission as applied to equal luminance signals in successive scannings, since this gives compatible reception with monochrome receivers at present. The equal luminance signals are translated into equal energy signals in the color receiver which emphasizes the fact that luminance and energy are merely different scales by which "illumination" may be defined. There are, even today, certain applications of color television where compatibility is not a factor, and there is a fair probability that in time monochrome television will be so largely displaced by polychrome that monochrome compatibility need no longer be considered. If compatibility is not important receivers can be somewhat simplified by transmitting constant energy signals; the color information can be encoded in the same manner as is here disclosed. In so doing, however, it is important to recognize that it is still necessary to encode the information as to hue by comparison of the luminance of the component colors, and not by comparison of their energy, for if this is not done the color picture will flicker.

The invention is applicable to single gun display tubes wherein the hue is varied by directing the beam from the single gun to color areas of different phosphors as well as the three gun type of display tube shown herein. Because, however, the claims in this specification are directed primarily to the system per se, rather than to specific apparatus for receiving the type of color information here contemplated, it is believed to be unnecessary to show or describe other specific apparatus. Furthermore, the showings herein have been simplified to the maximum degree possible in order to bring out more clearly the essential nature of the invention without undue reference to instrumentalities which are old and well known in the art. In connection with the transmitting equipment in particular, various intermediate amplifiers as buffers, cathode followers, and the like, would undoubtedly be employed in most instances but their showing would unduly increase the descriptive matter and drawings necessary and such ancillary equipment is well within the knowledge of those skilled in the art. For like reasons alternative constructions of instrumentalities which are shown and described in detail herein have not been given. This application is therefore not intended to be limited to the specific structure shown, all intended limitations being expressed in the following claims.

I claim:

1. In a system of television transmission wherein a field of view is repeatedly scanned in accordance with a regular pattern to produce electrical waves varying in intensity with time in accordance with the point-to-point variation of illumination of successive elementary areas of said field of view along the course scanned, the method of producing signals representative of three color components of said illumination from which polychrome images of said field of view may be reproduced which comprises the steps of developing separate trains of monochrome signals respectively representative of the luminance of each of said component colors in the elementary areas being scanned, mixing said trains of signals to produce a composite train of signals representative of the total luminance of the elementary areas being scanned, continuously comparing the instantaneous amplitudes of said trains of signals to determine the ratio of each thereof to the sum of the instantaneous amplitudes of all of said trains of signals, and developing in successive scannings of said field of view color control signals in accordance with a code wherein each relative amplitude of said control signals with respect to a reference amplitude represents a relative proportional amplitude of two only of said three signal trains, the color control signal developed in alternate scannings of said field representing the ratio of the amplitude of first one and then another of said signal trains to one-half the sum of the amplitudes of said signal trains.

2. The method in accordance with claim 1 wherein the step of developing color control signals includes the step of continuously varying the relative amplitude of said color control signals with respect to said reference amplitude in accordance with a code such that relative amplitudes of said color control signal of zero and equality with said reference amplitude are each representative of the same one of said component color trains of signals without admixture, amplitudes of one-third and two-thirds of said reference amplitude are representative respectively of the other two signal trains without admixture, and amplitudes between any two of said above mentioned amplitudes are representative of admixtures of the colors represented by the two above mentioned amplitudes between which such intermediate amplitudes lie.

3. The method in accordance with claim 2 which includes the step of so varying the amplitude of said color control signal that relative proportions of any two components in an admixture to be represented is indicated by a color signal of an amplitude the difference of which from the amplitudes representative of said components without admixture is substantially in inverse proportion to the relative percentage of the components of said admixture.

4. The method of developing signals for translation into polychrome television images of a field of view which comprises the steps of scanning said field in accordance with a repetitive pattern, developing from said scanning three separate trains of signals representative of the point-to-point variation of luminance of said field along said pattern with respect to three different component colors which added in substantially equal intensity will give the sensation of white, combining like proportions of the energy in each of said trains to form a total-luminance signal, comparing the amplitudes of each of said trains with said total luminance signal to derive three signals representative of the ratios of the respective component luminances to one-half of the total luminance, deriving from said ratio signals two color control signals representative respectively in accordance with a systematic code of two of said ratio signals, each of which is less than unity, and transmitting said color control signals alternately in successive scannings of said field and simultaneously transmitting said total luminance signal.

5. In a system of television wherein a field of view is scanned in a pattern such that odd order and even order lines are transmitted in successive fields, the method of transmitting information representative of the color of the areas being scanned which comprises transmitting continuously during the scanning of all fields a signal representative of the point-to-point variation of luminance along the scanning pattern, and simultaneously transmitting color control signals representative of the ratio of the luminance of one of three component colors to one-half of the total luminance, the ratio signal transmitted simultaneously with the odd-order-line luminance signal being representative of the said ratio of one component color luminance which is less than one-half of the total and the ratio signal transmitted simultaneously with the even-order line luminance signal being representative of the said ratio of a different component color luminance which is also less than one-half of the total.

6. The method of transmitting color television images of a field of view which comprises the steps of developing by repeated scannings a signal train representative of the point-to-point variations in luminance of said field, developing signal trains representative respectively of the ratios of the luminance of two different component colors to one half of said total luminance, and transmitting said last mentioned signals alternately in successive scannings of areas of the same hue concurrently with the transmission of said first mentioned signal as developed by the same scanning.

7. The method in accordance with claim 6 which includes the step of alternating the order of transmission of said second mentioned signals in successive scannings of the field of view as a whole.

8. The method in accordance with claim 6 wherein said second mentioned signals are alternated in scanning adjacent lines comprising said field of view.

9. The method of polychrome television transmission which comprises the steps of repeatedly scanning a field of view, developing a signal representative of the point-to-point variations of luminance in said field of view, developing color control signals representative, in alternate scannings of colored areas in said field of view, of ratios of the luminance of different component colors of a tri-color additive system to the total luminance integrated over two successive scannings of said areas, and simultaneously transmitting said luminance signal and said color control signal.

10. In a system for transmitting polychrome television images, the method of transmitting information representative of the hue of the areas to be depicted which comprises transmitting signals representative of the entire contribution of two component colors of a tri-color system to the luminance of said areas during successive scannings thereof and transmitting information representative of the contribution of the third component in each scanning, the representation as to said third component being so divided between successive scannings as to make the total representation of the contributions of all components unity when integrated over successive scannings.

11. The method of color television which includes the steps of generating three trains of signals representative of the contributions of three component colors to the total luminance of a field of view, continuously comparing the relative amplitudes of said trains to determine which is dominant in each area of said field of view, and transmitting in successive scannings of said field of view signals representative of the total contribution of the two subdominant colors plus a portion of the contribution of said dominant color in each.

12. In combination with means for developing a set of three trains of signals respectively representative of the point-to-point variations of illumination of a field of view by three component colors in repeated scannings thereof, apparatus comprising means for comparing the relative amplitudes of said trains of signals, means for developing a second set of three trains of signals representative respectively of the ratios of the amplitudes of each of the trains of signals of said first set to one-half of the sum of the amplitudes thereof, means for comparing the relative amplitudes of said second set of signal trains and to select two thereof each representing said ratio and of a maximum value thereof of unity, means for developing a plurality of constant voltages each representative of said ratio at a value of unity with respect to one of said component colors in accordance with an arbitrarily selected code, means for adding algebraically the voltage of the selected signals of said second set to the arbitrarily selected voltage representative of the ratio of the third component color, means for developing a carrier frequency oscillation, and means for modulating said oscillation with the sum of said added voltages to supply a color control signal for transmission concurrently with signals proportional to the sum of said first mentioned set of trains of signals.

13. In combination with a transmitter of television signals and a source of a set of three signal trains representative respectively of the point-to-point variations of illumination of a field of view in successive scanning by three color components of the total illumination thereof, means for adjusting the relative amplitudes of said trains to proportionality with the relative luminance of said color components, and means for mixing the adjusted signals to provide a luminance signal proportional to the sum thereof, means for modulating said transmitter with said luminance signal; an oscillator for generating a color control oscillation for concurrent transmission with said luminance signal, means for amplitude-modulating said oscillation and means for developing a modulating component for supplying said last mentioned modulating means comprising means for developing signals representative respectively of the ratios of each of said adjusted trains of signals to one-half the sum thereof, means for modifying each of said ratio signals in accordance with a code representative of the ratio of the luminance of any two subdominant color components of said luminance signals to one-half of the total luminance signal, and means for switching two of said modified signals into said modulating means alternately in successive scannings of areas of said field of view of the same color.

References Cited in the file of this patent

UNITED STATES PATENTS

| | | |
|---|---|---|
| 2,590,350 | Roeper | Mar. 25, 1952 |
| 2,643,289 | Sziklai | June 23, 1953 |
| 2,664,462 | Bedford | Dec. 29, 1953 |
| 2,716,151 | Smith | Aug. 23, 1955 |